United States Patent
Panchani et al.

(10) Patent No.: US 11,409,942 B2
(45) Date of Patent: Aug. 9, 2022

(54) PORTABLE BRAILLE TRANSLATION DEVICE AND METHOD

(71) Applicant: Xerox Corporation, Norwalk, CT (US)

(72) Inventors: Rajana M. Panchani, London (GB); Michael D. McGrath, Rochester, NY (US); Patrick W. B. Gerrits, Wijchen (NL); Peter Granby, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/142,316

(22) Filed: Jan. 6, 2021

(65) Prior Publication Data

US 2022/0215154 A1    Jul. 7, 2022

(51) Int. Cl.
| | |
|---|---|
| H04N 1/40 | (2006.01) |
| G06F 40/103 | (2020.01) |
| G09B 21/00 | (2006.01) |
| B41J 3/32 | (2006.01) |
| G06V 30/40 | (2022.01) |
| G06V 30/142 | (2022.01) |

(52) U.S. Cl.
CPC .............. *G06F 40/103* (2020.01); *B41J 3/32* (2013.01); *G06V 30/142* (2022.01); *G06V 30/40* (2022.01); *G09B 21/003* (2013.01)

(58) Field of Classification Search
None
See application file for complete search history.

(56) References Cited

U.S. PATENT DOCUMENTS

| | | | |
|---|---|---|---|
| 5,920,649 A | 7/1999 | Yasuda et al. | |
| 5,982,911 A * | 11/1999 | Matsumoto | G09B 21/003 348/62 |
| 6,948,937 B2 | 9/2005 | Tretiakoff et al. | |
| 7,341,456 B2 | 3/2008 | McAdams et al. | |
| 8,885,193 B2 * | 11/2014 | AlSalman | H04N 1/00127 358/1.15 |
| 9,875,670 B2 * | 1/2018 | Al-Salman | B41J 3/32 |
| 2008/0206722 A1 * | 8/2008 | Fukami | G09B 21/02 434/114 |
| 2011/0207093 A1 * | 8/2011 | Keyes | G09B 21/025 434/114 |
| 2012/0236134 A1 * | 9/2012 | Keyes | G06K 9/228 348/62 |
| 2013/0316312 A1 * | 11/2013 | Jin | G09B 21/003 434/114 |
| 2015/0239259 A1 * | 8/2015 | Morgan | B41J 3/32 400/109.1 |
| 2015/0310766 A1 * | 10/2015 | Alshehri | G09B 21/004 434/114 |
| 2020/0160747 A1 | 5/2020 | Yang et al. | |

\* cited by examiner

*Primary Examiner* — Dung D Tran
(74) *Attorney, Agent, or Firm* — Gibb & Riley, LLC (57) ABSTRACT

Devices and methods use a processor, a scanner, and a display screen. The processor is used to recognize Braille characters within the field of view of the scanner. The processor is used to convert the Braille characters into text, and the display screen is used to display the text visibly.

15 Claims, 8 Drawing Sheets

PORTABLE BRAILLE TRANSLATION DEVICE AND METHOD

BACKGROUND

Systems and methods herein generally relate to devices to assist site-impaired individuals and more particularly to devices that translate visible text into Braille.

The tactile writing system for sight-impaired individuals that is commonly referred to as Braille utilizes multiple columns of raised dots of different patterns that are often embossed in paper or provided through touch-output Braille output devices. Braille is a well-accepted writing system and many different machines and systems have been developed to translate visible text into Braille, including printing devices that output the embossed dots of the Braille language on paper.

In some examples, books that were originally only printed with visible text are converted into Braille books to allow sight-impaired users access. Additionally, many public locations such as elevators, hallways, restrooms, etc., include signs written in both visible text and in tactile Braille. Further, tactile output devices can provide the raised dots of a single Braille character to a finger of the user, or tactile output devices can even provide entire lines or pages of Braille characters. While these devices and systems increasingly offer sight-impaired users access to visible printed text, additional improvements in this area are always welcome.

SUMMARY

Various printing apparatuses herein include, among other components, a processor, a printing engine operatively (directly or indirectly) connected to the processor, a display screen operatively connected to the processor, a scanner (e.g., wand, camera, etc.) operatively connected to the processor, etc. The scanner can include any form of optical or sonic device capable of identifying Braille characters including optical scanners, optical cameras, sonic devices, etc.

The processor is adapted to recognize Braille characters within the field of view of the scanner according to the signals output from the scanner and the processor is adapted to convert the Braille characters into text. The display screen is adapted to display the text output from the scanner, potentially at the same time the Braille characters are within the field of view of the scanner. The printing engine is adapted to print the visible text on print media and/or to emboss patterns representing the Braille characters on the print media.

In such devices, a tactile Braille output device can also be operatively connected to the processor to allow the Braille characters to be output and read through a user's physical touch of the tactile Braille output device. An input/output device can also be operatively connected to the processor. Such an input/output device is adapted to transmit the visible text and/or Braille characters to external devices, such as facsimile servers, email servers, document storage servers, etc.

In some embodiments, the scanner can be a hand-held wand that is detachable from the printing apparatus, and such a scanner wand can be in communication (wired or wireless) with the processor of the printing device. Alternatively, the apparatus can be a stand-alone, handheld, portable Braille scanner apparatus unconnected to printing devices. Such a portable Braille scanner apparatus can include the processor, scanner, and display screen and can recognize Braille characters within the field of view of the scanner, convert the Braille characters into text, and display the text visibly on the display screen.

Thus, the portable Braille scanner can translate Braille into on-screen visible text at any location (e.g., in the field) to allow non-Braille proficient users to read the translated Braille signs and/or books. The scanner wand can be used by operators of printing apparatuses to scan in Braille items (e.g., books, documents, etc.) to allow such Braille items to be copied or transmitted in either visible text or Braille.

In either the scanner wand or the stand-alone handheld portable Braille scanner apparatus, the processor can also be adapted to recognize visible text characters within the field of view of the scanner wand or camera. The processor is adapted to convert the visible text characters into Braille characters. This allows the apparatuses herein to perform Braille-to-text translation/copying, Braille-to-Braille translation/copying, and text-to-Braille translation/copying.

Various methods herein recognize Braille characters within the field of view of the scanner of the handheld device, convert the Braille characters into text using the processor of the handheld device, and display the text visibly using the display screen of the handheld device. The visible text can be displayed at the same time the Braille characters are within the field of view of the scanner.

These methods can power the handheld device using a battery of the handheld device. Also, these methods can recognize visible text characters within the field of view of the scanner, convert the visible text characters into Braille characters, and output the Braille characters using the tactile Braille output device of the handheld device. The process of recognizing Braille characters may be performed using an optical or sonic device of the scanner. These methods also can transmit the visible text to external devices using an input/output device of the handheld device.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, existing systems can convert visible textbooks into Braille books to allow sight-impaired users access to such materials. Also, tactile output devices can provide the Braille characters' raised dots to a single finger of the user, or tactile output devices can present entire lines or pages of Braille characters to the user.

The apparatuses and methods herein provide handheld devices that can be utilized to scan either printed visible text or Braille and convert the same into text or Braille. The systems and methods herein are very useful for providing non-sight-impaired users with translations of Braille into visible text. This allows non-sight-impaired users to check the position and location of Braille characters to ensure their proper utilization. In other words, these systems and methods allow non-sight-impaired users to proofread various Braille books and signs, whether the user understands Braille or not. Further, these systems and methods are useful for providing sight-impaired users the ability to easily scan Braille documents that can be later converted to visible text documents.

The devices and methods herein offer support to those users that are visually impaired by providing, in one embodiment, a wireless wand that performs Braille-to-text or text-to-Braille translation, so the translated form can be printed, for example. This makes the communication and workflows between normal and visually impaired users easier. In some examples, these devices and methods digitize a braille document that has been scanned and then save the file on a server, which can be printed. This converts a braille document into text for a non-impaired visual person's use.

Adding a Braille scanner wand to an existing printing device family may not require hardware modifications, which tend to be very costly, because simple connections (e.g., USB, Bluetooth, etc.) can be utilized and all additional processing (e.g., Braille translation) can be performed by the processor within the wand or through a simple update of the printer's software applications. In one example, the wand's processor outputs the scanned file into a format that a printer can immediately use or that the printer can convert to either text or to braille, which can then be printed. In one example, the conversion of the Braille is performed by standard Optical Braille Recognition (OBR) software. Additionally, the file output by the wand can be stored as a document on a server or directly printed as a visually readable visible text document.

Different devices herein can handle one or more Grades of Braille. Generally, Braille can be considered to have three different Grades. These include Grade 1, which is a character for character translation of plain visible text (for example alphabetic characters and punctuation marks); Grade 2, which uses a contracted form of Braille (for example, there is a single symbol for "the" rather than spelling it out t-h-e, which makes reading of documents much faster); and Grade 3, which is Braille shorthand and is the least used Grade of Braille because it is not widely standardised. Since Grade 3 has not been standardised it has not been used for official publications.

Different feature-levels are provided in different versions of the devices herein. Some low-feature devices herein may only process Grade 1 Braille, while higher-feature devices herein may process Grades 1, 2, and/or 3. Devices and methods herein detect which grade of Braille is being scanned and automatically process the scan differently depending upon the detected Grade. If a lower-feature device is not capable of processing a specific Braille Grade, an error message is provided to the user.

Thus, the devices and methods herein provide a way to interpret visible text and/or braille and scan/print such information. This helps support teacher/pupil type learning to bridge between seeing and not seeing people, for example. Further, the devices and methods herein support medical records/personal information on a braille document, promoting sharing at chemists/hospitals/dentists, etc. Also, the devices and methods herein are highly useful for checking what Braille signage actually says. All such data can be saved and sent to third party sign producers. Devices and methods herein also allow error/grammar checking of Braille documents by those not proficient in Braille.

Figure 1:
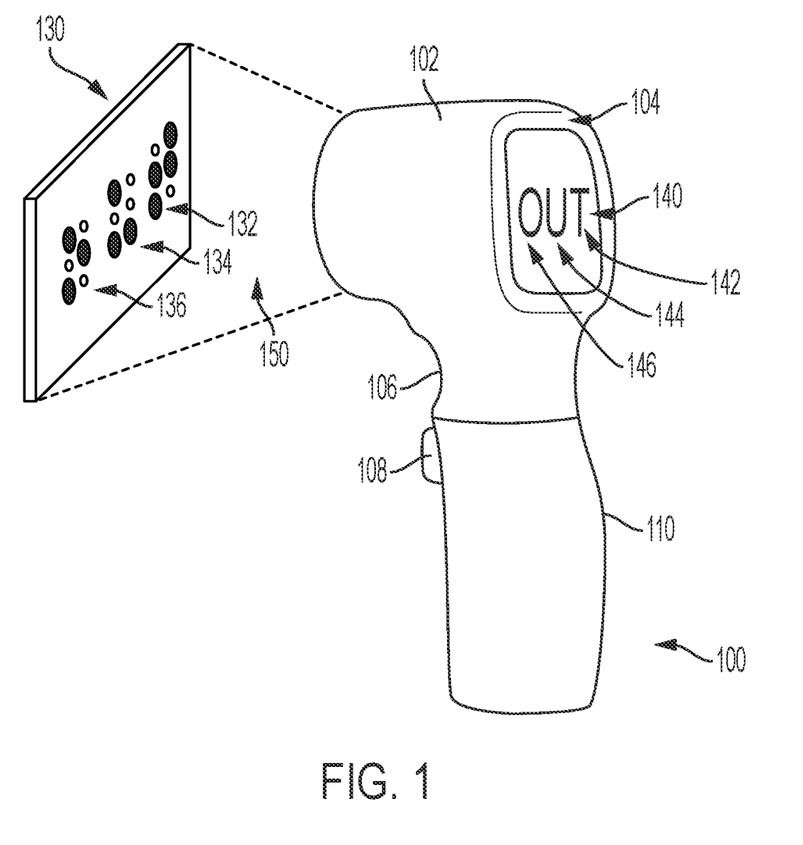
FIG. 1 is a perspective-view schematic diagram illustrating devices herein.
Figure 2:
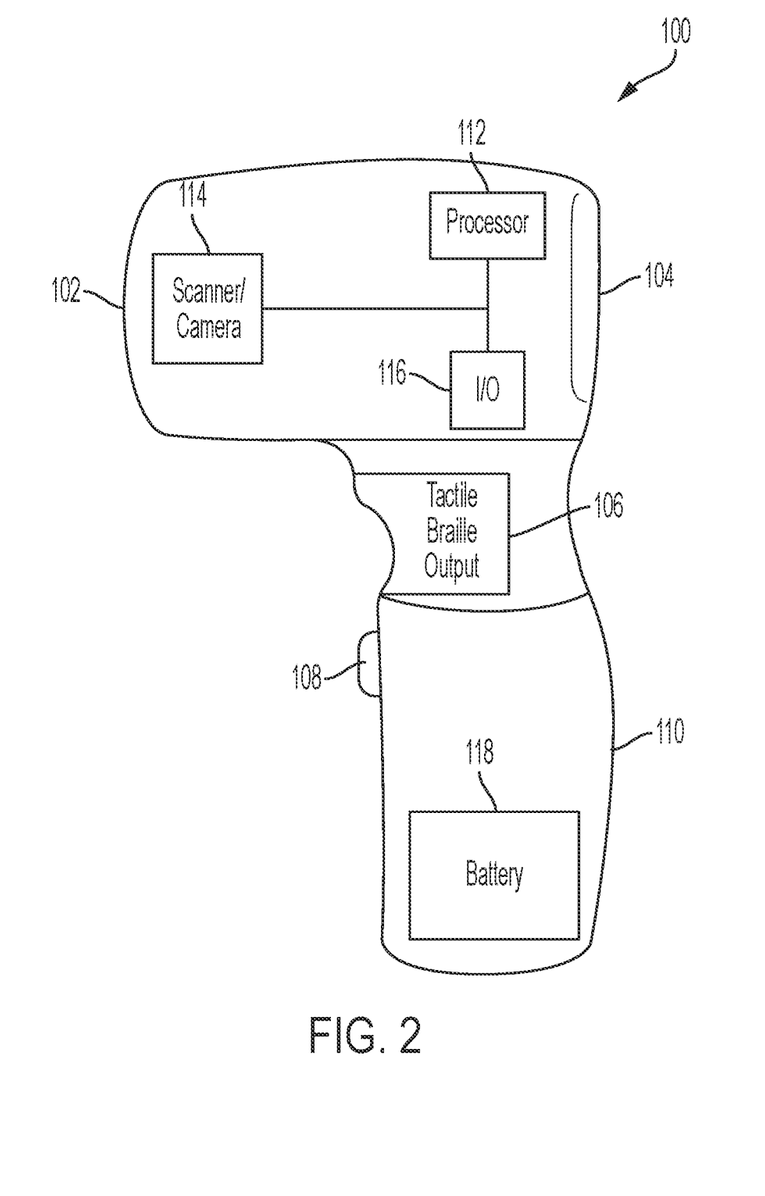
FIG. 2 is a cross-sectional view schematic diagram illustrating devices herein.
Figure 3:
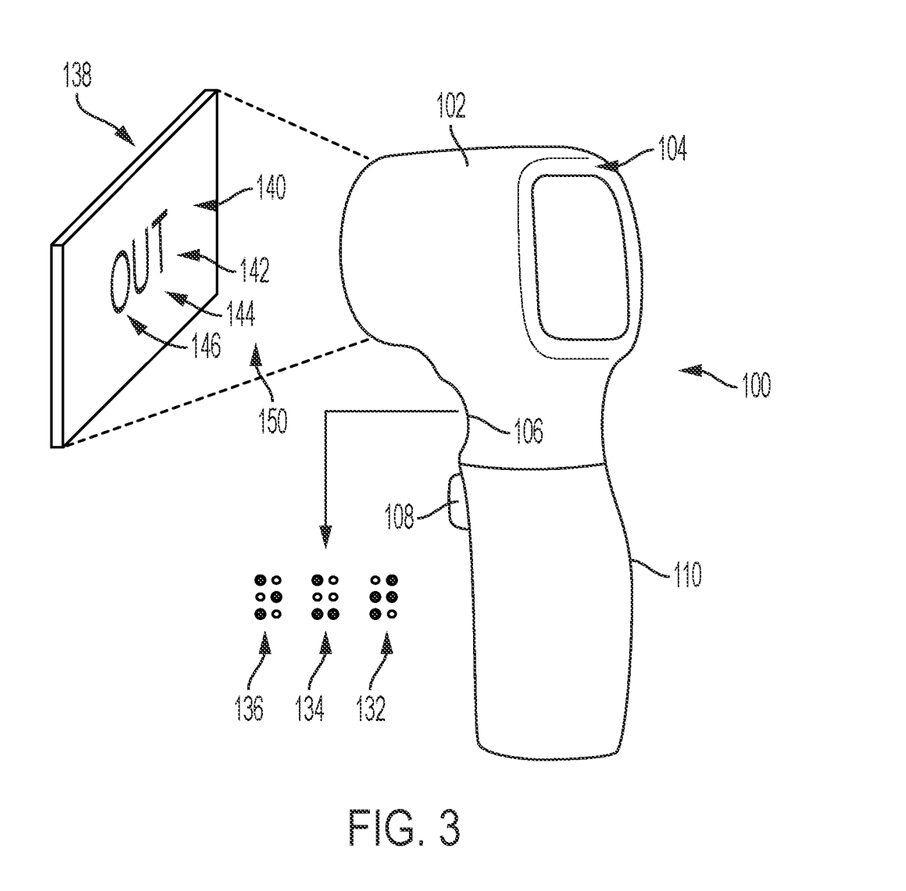
FIG. 3-4 are perspective-view schematic diagrams illustrating devices herein.

Referring now to the drawings, FIGS. 1-3 illustrate an example of a stand-alone, self-powered, handheld, portable Braille scanner apparatus 100 that is potentially unconnected to, and unassociated with, printing devices. Such a portable Braille scanner apparatus 100 can include a body/exterior 102 in/on which are located a processor 112, scanner/camera 114, display screen 104, input/output device 116, tactile Braille output device 106, activation button 108, battery 118, etc. A handle portion 110 of the body 102 may be textured to provide a comfortable, non-slip grip/handle for the user to easily hold, allowing the user to operate the Braille scanner apparatus 100 using just one hand.

In the example shown in FIG. 1, the portable Braille scanner apparatus 100 can be oriented/held by a user so that the scanner camera 114 is aimed toward an item (such as a book or sign 130) that contains Braille 132, 134, 136. When the user presses the activation button 108, the scanner/camera 114 can capture/scan the Braille characters 132, 134, 136 within the field of view 150 of the scanner/camera 114. The processor 112 translates the Braille into text (e.g., using OBR processing) and the display 104 instantly displays the translated text 140 visibly.

Specifically, the Braille pattern 136 shown in FIG. 1 translates to the letter "O" 146; the Braille pattern 134 translates to the letter "U" 144; and the Braille pattern 132 translates to the letter "T" 142. Thus, both the Braille and visible text form the word "OUT" which may be used in signage to direct users to various exits, for example.

Braille scanners and cameras or commonly available devices, and such devices optically, sonically, etc., detect the raised areas of each individual Braille character 132, 134, 136 (e.g., by observing visual shadows in images or measuring bump heights relative to flat surfaces, etc.). The OBR processing then converts each pattern of raised areas in the different columns of the Braille characters to alphanumeric characters (e.g., A-Z, 0-9, punctuation, etc.).

Some OBR processing techniques automatically correct perceived errors such as transposed letters, incorrectly recognized patterns of bumps in scans, etc., in order to provide the cleanest Braille-to-text translation possible. However, some embodiments herein provide an option to prevent such automatic corrections from occurring, with the default option shutting the automatic correction off. The embodiments herein default to having no automatic correction because the devices and methods herein are sometimes utilized to proofread existing Braille text, which may have been installed or formed incorrectly. In other words, by keeping OBR's automatic correction features off, improperly formed Braille characters and grammatical/spelling errors will be provided as output, allowing the Braille proofreading to be more accurate. While the automatic correction can always be turned on through menu choices, not using automatic correction enhances the proofreading ability of these devices and methods.

Thus, the embodiments herein are very useful for users who are not proficient in Braille but desire to check/proofread various Braille words that may be in visible text or on signage. Thus, the portable Braille scanner 114 can translate Braille into on-screen 104 visible text 140 at any location (e.g., in the field) to allow non-Braille proficient users to proofread the translated Braille signs and/or books.

Additionally, the input/output device 116 (that is operatively connected to the processor 112) is adapted to transmit the visible text 140 and/or Braille characters 132, 134, 136 to external devices (using connected wires or wirelessly through computer networks), such as facsimile servers, email servers, document storage servers, etc. Therefore, any Braille characters scanned in by the portable Braille scanner apparatus 100 can be sent to printers to be printed, saved as a document in cloud storage, sent to other devices over computerized networks, etc.

The tactile Braille output device 106 is also operatively connected to the processor 112 to allow Braille characters 132, 134, 136 to be output to the tactile Braille output device 106. Specifically, an optional concave curved portion (recessed, inwardly curved portion) of the handle 110 where the tactile Braille output device 106 is located is at the position of the handle 110 where a user's finger would rest, and the concave curve may be sized to match the average size of a human finger. In other embodiments, the tactile Braille output device 106 may be positioned along a linear (non-recessed) portion of the body 102 of the portable Braille scanner apparatus 100.

The tactile Braille output device 106 is a commonly available device and includes columns of projection elements (e.g., piezoelectric elements, motor actuated elements) that extend and retract to match the Braille bump pattern being output. In other words, the projections of the tactile Braille output device 106 extend and retract to match the embossed bumps a user would feel when touching a sheet with Braille characters embossed thereon. With various embodiments herein, most of the tactile Braille output device 106 can be located within the interior of the handle 110, with only the tactile output portion having the columns of projection elements resting along the surface of the concave curved portion of the handle 110 that the user's finger contacts.

While some larger tactile Braille output devices can simultaneously represent multiple Braille characters (some tablet size tactile Braille output devices can even output an entire page of Braille characters at one time) with the compact form of the tactile Braille output device 106 positioned along the handle portion 110 of the portable Braille scanner apparatus 100, some embodiments herein present a single Braille character or a few Braille characters at a time through the tactile Braille output device 106. In other words, each sequential Braille character may be individually briefly output through the tactile Braille output device 106 for a period of time and then followed by the next Braille character, where the series of Braille characters that are output through the tactile Braille output device 106 form the words that are being output.

Therefore, as shown in FIG. 3, an item 138 (e.g., a sign, book, etc.), that for simplicity of discussion and illustration contains the same word 140 discussed above ("OUT"), can be located within the field of view 150 of the optical scanner/camera 114. The visible text 140 is converted into Braille (using a reverse form of OBR processing) and the Braille is output through the tactile Braille output device 106. FIG. 3 illustrates this tactile Braille output conceptually using a block arrow and Braille patterns 132, 134, 136 shown in space next to the handle 110 of the portable Braille scanner apparatus 100.

Figure 4:
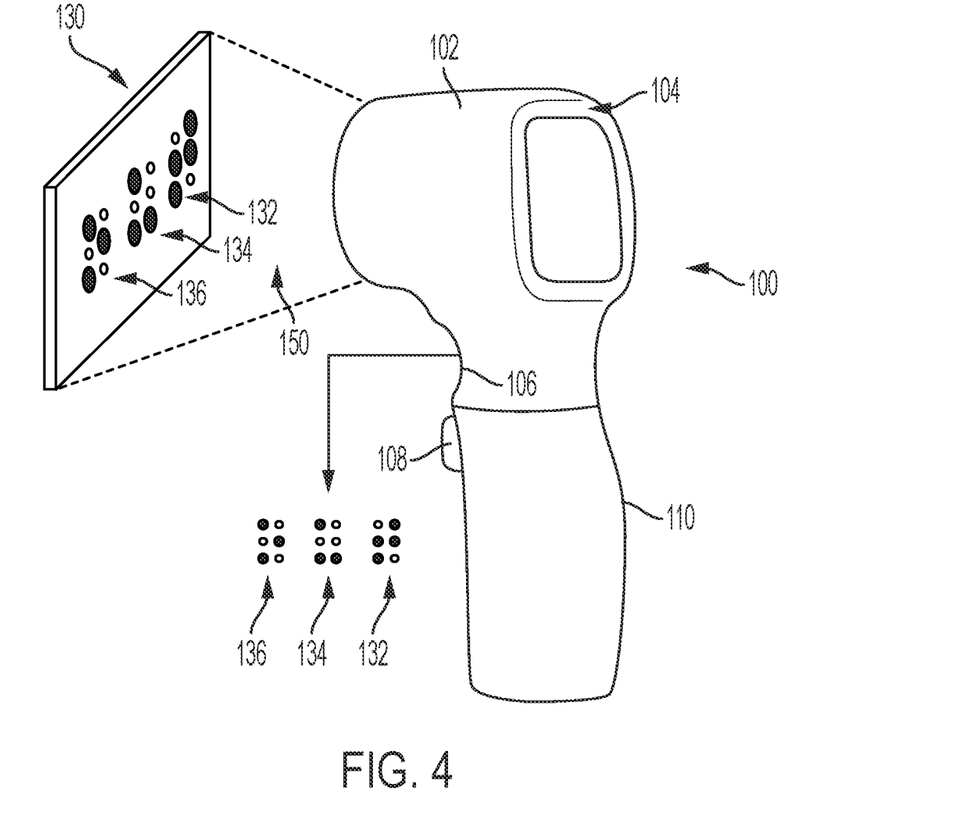

Thus, FIG. 1 illustrates the situation where the portable Braille scanner apparatus 100 is used to perform Braille-to-text translation, while FIG. 3 illustrates the situation where the same portable Braille scanner apparatus 100 is used to perform text-to-Braille translation. FIG. 4 illustrates Braille-to-Braille translations.

More specifically, as shown in FIG. 4, the portable Braille scanner apparatus 100 can perform Braille-to-Braille translations where, for example, a sight impaired individual may desire to read Braille characters in a non-contact, indirect manner through their own personal Braille output device (e.g., in order to avoid repeatedly touching public surfaces containing Braille that may be contaminated with germs or viruses).

The processor 112 is also adapted to translate the scanned Braille into a different Braille Grades (see the discussion of the different Braille Grades above) when performing the Braille-to-Braille translations shown in FIG. 4. Thus, for example, if the Braille is written in Grade 2 (contracted form of Braille) but the user is not proficient in Grade 2 Braille, the processor 112 can be set to (or can automatically) convert the Grade 2 Braille (scanned in by the scanner/camera 114) into Grade 1 Braille, which is then output through the tactile Braille output device 106. Similarly, one proficient in Grade 2 or Grade 3 Braille can have Grade 1 Braille translated into a higher Grade of Braille to allow that proficient user to read the Braille quicker and with less effort/frustration compared to sequentially reading each individual Grade 1 letter from the tactile Braille output device 106.

In addition, by operating as a personal Braille-to-Braille reader, the portable Braille scanner apparatus 100 is able to amplify the Braille patterns being output for users who, for example, have finger sensitivity issues or to overcome touch issues that occur when the raised bumps of Braille visible text become worn down and difficult to detect physically by touch.

Figure 5:
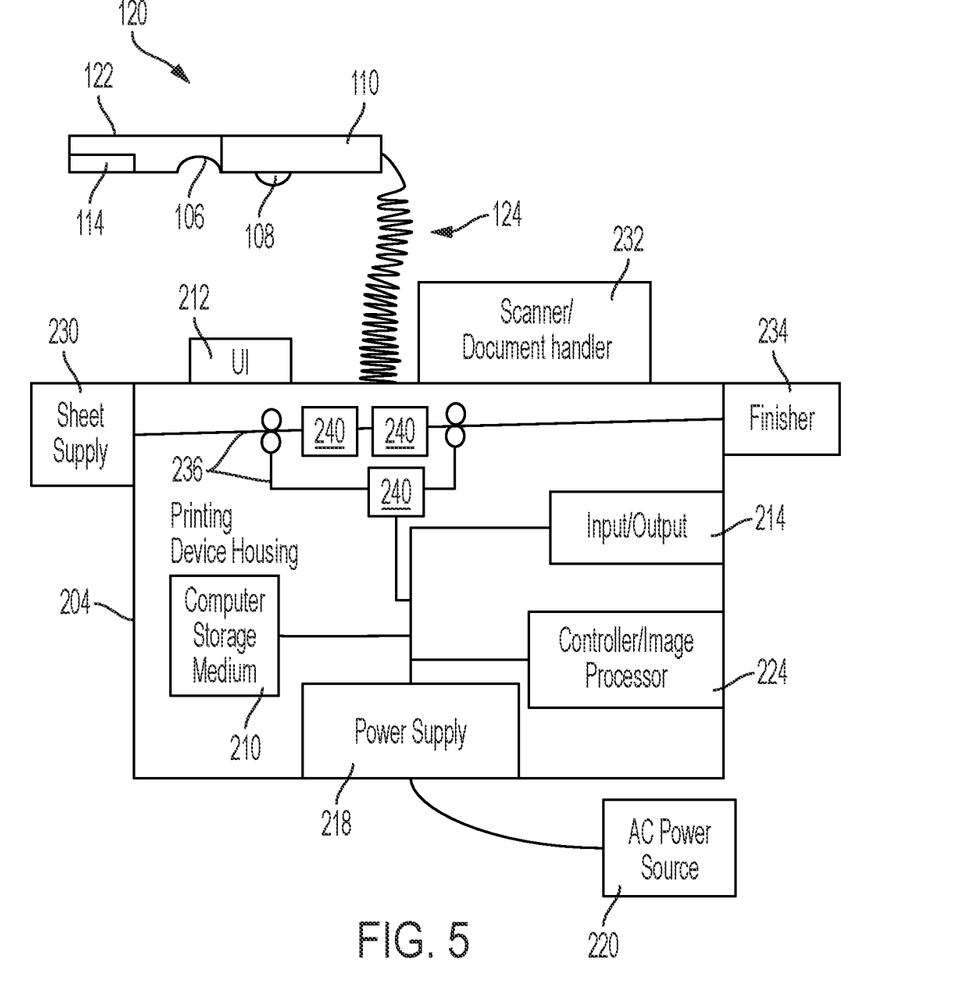
FIGS. 5-6 are cross-sectional view schematic diagrams illustrating devices herein.

FIG. 5 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a user interface (UI) assembly 212, hand-held wand 120, etc. The user may receive messages, instructions, and menu options from, and enter instructions through, the user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 5, a body housing has one or more functional components that operate on power supplied from an alternating current (AC) source 220 by the power supply 218. The power supply 218 can comprise a common power conversion unit, power storage element (e.g., a battery, etc), etc.

The printing device 204 includes at least one marking device (printing engine(s)) 240 that use marking material, and are operatively connected to a specialized image processor 224 (that may be different from a general-purpose computer because it is specialized for processing image data), a media path 236 positioned to supply continuous media or sheets of media from a sheet supply 230 to the marking device(s) 240, etc.

Additionally, the printing engines 240 may comprise embossing engines specifically design to print Braille markings on paper by physically pushing and distorting the surface of the paper (physical embossing). Alternatively, the printing engines may comprise laser or ink printers capable of depositing different heights of toner/ink in order to form raised bumps and thereby print raised Braille characters on the paper (printed Braille). The printing engines 240 are intended to illustrate all forms of Braille printing devices, whether currently known or developed in the future. Therefore, the Braille characters can be printed on the sheets of media by the printing engines 240 using either inks/toners or by physically forming indentations and raised areas using embossing devices.

After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that performs embossing or applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, embossing devices, etc. The one or more printing engines 240 can include, for example, devices that use a photoreceptor belt or an intermediate transfer belt or devices that print directly to print media (e.g., inkjet printers, ribbon-based contact printers, etc.).

The scanner wand 120 can be used by operators of the printing device 204 to scan in Braille items (e.g., books, documents, etc.) to allow such Braille items to be copied or transmitted in either visible text or Braille (possibly Braille of a different Grade). In some embodiments, the hand-held scanner wand 120 is detachable from the printing apparatus 204, and such a scanner wand 120 can be in communication (wired or wireless) with the processor 224 of the printing device 204. For example, the scanner wand 120 can be completely physically separate from the printing apparatus 204 or can be connected to the printing apparatus 204 by way of a cable 124, which can be a communications cable (e.g., USB cable) or can be a simple retractable wire tether that prevents the scanner wand 120 from being taken too far from the printing device 204. Additionally, the scanner wand 120 may be connected to the printing device 204 by a hook, magnetic holder, tray holder, during non-use (during storage).

As shown in FIG. 5, the hand-held scanner wand 120 includes many of the items discussed above and shown in FIGS. 1-4 including the tactile Braille output device 106, the activation button 108, the handle 110, the camera/scanner 114, etc. The body of the scanner wand 120 is identified as item 122 in FIG. 5.

Figure 6:
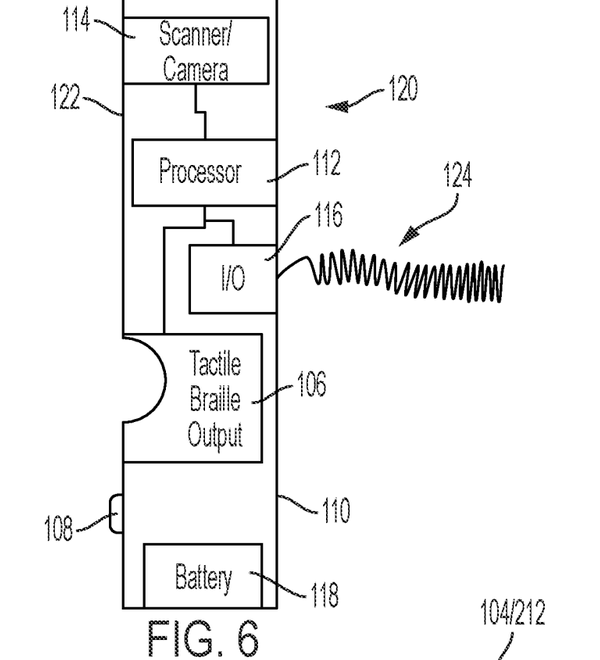

FIG. 6 shows some internal components of the scanner wand 120 in conceptual cross-sectional view including the scanner/camera 114, processor 112, input/output 116, tactile Braille output device 106, and battery 118. In contrast with FIGS. 1-4, FIG. 6 illustrates that the scanner wand 120 may optionally not include its own display because the scanner wand 120 can use the user interface 212 of the printing device 204. Also, the scanner wand 120 may use the processor 224 of the printing device 204 or may use the scanner wand's 120 own processor 112. Also, for embodiments that use a USB or other electrical wire connection between the scanner wand 120 and the printing device 204, the battery 118 may be eliminated or reduced in size because a wired connection can supply power from the power supply 218 to the scanner wand 120.

Figure 7:
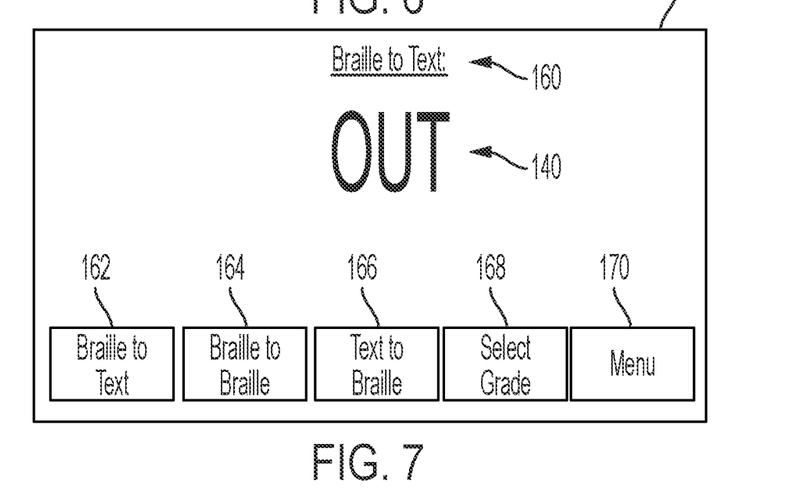
FIG. 7 is a front-view schematic diagram illustrating a display screen herein.

FIG. 7 shows one example of a display screen 104/212 of devices herein. As shown in FIG. 7, the display screen 104/212 may include an identifier 160 of what is being shown (in this case the translation of "Braille to Text") which shows the visible text 140 discussed above. In this example, the display screen 104/212 also includes some menu buttons (which can be physical buttons or virtual buttons on a touchscreen). These buttons can control many different functions and, in the example shown in FIG. 7, these buttons allow the user to switch between Braille-to-text translation 162, Braille-to-Braille translation 164, text-to-Braille translation 166, etc. While manual selection of the form of translation can be made through buttons 162, 164, 166, the processor 112/214 can automatically identify the text/Braille in the field of view 150 of the scanner 114 to automatically determine which form of translation to perform. Such menu items can also allow users to select to which Braille Grade the translation will be made 168 (in, for example, Braille-to-Braille translations of different Grades). Other menu screens can be accessed using button 170.

In either the scanner wand 120 or the stand-alone handheld portable Braille scanner apparatus 100, the processor 112/214 can again be adapted to recognize visible text 140 characters within the field of view 150 of the scanner 114 wand 120 or camera. Thus, again the processor 112/214 is adapted to convert the visible text 140 characters into Braille characters 132, 134, 136, allowing all apparatuses herein to perform Braille-to-text translation/copying, Braille-to-Braille translation/copying, and text-to-Braille translation/copying.

Figure 8:
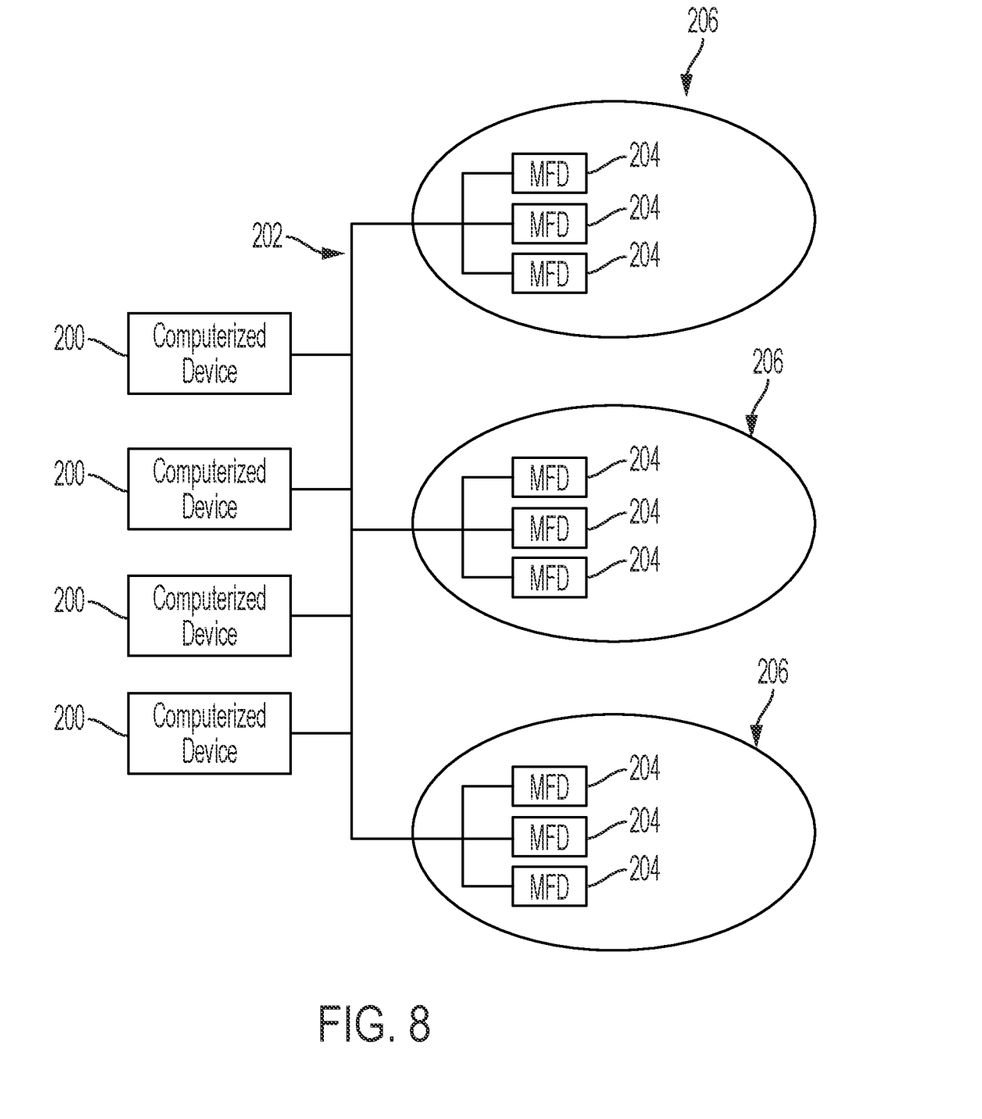
FIG. 8 is a schematic diagram illustrating systems herein.

FIG. 8 illustrates exemplary systems and methods herein that include various computerized/printing devices 200, 204 located at various different physical locations 206. The computerized devices 200, 204 can include print servers, printing devices, personal computers, etc., and are in communication (operatively connected to one another) by way of a local or wide area (wired or wireless) network 202. As noted above, the input/output device 116 (that is operatively connected to the processor 112) is adapted to transmit the visible text 140 and/or Braille characters 132, 134, 136 to external devices 200 (using connected wires or wirelessly), such as facsimile servers, email servers, document storage servers, etc. Therefore, any Braille characters scanned in by the portable Braille scanner apparatus 100 or scanner wand 120 can be sent to printers 204 to be printed, saved as a document in cloud storage 200, sent to other devices 200 over computerized networks 202, etc.

Figure 9:
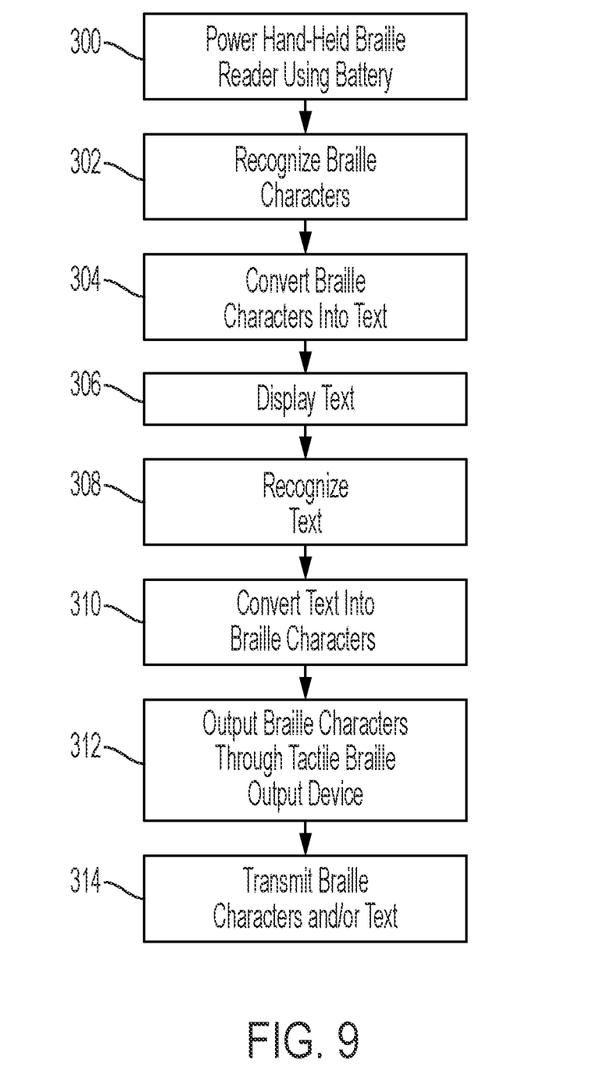
FIG. 9 is a flowchart illustrating processing herein.

FIG. 9 is a flowchart illustrating exemplary methods herein. In item 300, the methods herein power the handheld device using a battery (or using a printer's power supply). These methods then recognize Braille characters within the field of view of the scanner of the handheld device in item 302. The process of recognizing Braille characters may be performed using an optical or sonic device of the scanner. In item 304, such methods convert the Braille characters into text using the processor of the handheld device. Then, in item 306, the methods display the text visibly using the display screen of the handheld device. The visible text can be displayed in item 304 at the same time the Braille characters are within the field of view of the scanner in item 300.

These methods can also recognize visible text characters within the field of view of the scanner in item 308. In item 310, such methods convert the visible text characters into Braille characters (possibly of different Grades). With these methods, in item 312, the Braille characters are output using the tactile Braille output device of the handheld device. These methods also can transmit the visible text to external devices using an input/output device of the handheld device in item 314.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A handheld apparatus comprising:
   a body having a handle portion;
   a processor within the body;
   a tactile output device on the handle portion operatively connected to the processor;
   a camera on the body operatively connected to the processor; and
   a display screen on the body operatively connected to the processor,
   wherein the processor is adapted to recognize Braille characters and text characters within a field of view of the camera,
   wherein the processor is adapted to convert the Braille characters into output text and convert the text characters into output Braille,
   wherein the display screen is adapted to provide Braille-to-text translation by displaying the output text visibly, and
   wherein the tactile output device is adapted to provide text-to-Braille translation by outputting the output Braille as Braille bump patterns.

2. The handheld apparatus according to claim 1, further comprising a battery operatively connected to the processor,
   wherein, when operating under battery power supplied by the battery, the apparatus comprises a handheld portable apparatus.

3. The handheld apparatus according to claim 1, wherein the processor is adapted to translate the Braille characters from one Braille Grade to a different Braille Grade, and wherein the tactile output device is adapted to provide Braille-to-Braille translation by outputting the different Braille Grade as the Braille bump patterns.

4. The handheld apparatus according to claim 1, further comprising an input/output device operatively connected to the processor,
   wherein the input/output device is adapted to transmit the output text to external devices.

5. The handheld apparatus according to claim 1, further comprising a button on the body, wherein the display screen is adapted to display the output text visibly at the same time the Braille characters are within the field of view of the camera and the button is activated.

6. A printing apparatus comprising:
   a processor;
   a printing engine operatively connected to the processor;
   a display screen operatively connected to the processor; and a scanner wand operatively connected to the processor,
wherein the scanner wand includes a tactile output device operatively connected to the processor,
wherein the processor is adapted to recognize Braille characters and text characters within a field of view of the scanner wand,
wherein the processor is adapted to convert the Braille characters into output text and convert the text characters into output Braille,
wherein the display screen is adapted to provide Braille-to-text translation by displaying the output text visibly,
wherein the tactile output device is adapted to provide text-to-Braille translation by outputting the output Braille as Braille bump patterns, and
wherein the printing engine is adapted to print visible marks representing the output text on print media and to print embossed patterns representing the output Braille on the print media.

7. The printing apparatus according to claim 6, wherein the scanner wand comprises a detachable, hand-held device wirelessly in communication with the processor.

8. The printing apparatus according to claim 6, wherein the processor is adapted to translate the Braille characters from one Braille Grade to a different Braille Grade, and wherein the tactile output device is adapted to provide Braille-to-Braille translation by outputting the different Braille Grade as the Braille bump patterns.

9. The printing apparatus according to claim 6, further comprising an input/output device operatively connected to the processor,
wherein the input/output device is adapted to transmit the output text to external devices.

10. The printing apparatus according to claim 6, further comprising a button on the scanner wand, wherein the display screen is adapted to display the output text visibly at the same time the Braille characters are within the field of view of the scanner wand and the button is activated.

11. A method comprising:
recognizing Braille characters and text characters within a field of view of a camera of a handheld device;
converting the Braille characters into output text using a processor of the handheld device;
converting the text characters into output Braille using the processor of the handheld device;
displaying the output text using a display screen of the handheld device to provide Braille-to-text translation; and
outputting the output Braille as Braille bump patterns using a tactile output device of the handheld device to provide text-to-Braille translation.

12. The method according to claim 11, further comprising powering the handheld device using a battery of the handheld device.

13. The method according to claim 11, further comprising: translating the Braille characters from one Braille Grade to a different Braille Grade using the processor; and
outputting the different Braille Grade as the Braille bump patterns using the tactile output device to provide Braille-to-Braille translation.

14. The method according to claim 11, further comprising transmitting the output text to external devices using an input/output device of the handheld device.

15. The method according to claim 11, wherein the displaying the output text is performed at the same time the Braille characters are within the field of view of the camera and a button on the handheld device is activated.

* * * * *